(12) United States Patent
Eto et al.

(10) Patent No.: US 11,618,133 B2
(45) Date of Patent: Apr. 4, 2023

(54) WORKPIECE SUPPORTING DEVICE AND WORKPIECE SUPPORTING METHOD

(71) Applicant: MITSUBISHI HEAVY INDUSTRIES, LTD., Tokyo (JP)

(72) Inventors: Jun Eto, Tokyo (JP); Manabu Hayashi, Tokyo (JP); Osamu Katsuchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 290 days.

(21) Appl. No.: 16/971,297

(22) PCT Filed: Feb. 14, 2019

(86) PCT No.: PCT/JP2019/005236
§ 371 (c)(1),
(2) Date: Aug. 19, 2020

(87) PCT Pub. No.: WO2019/163620
PCT Pub. Date: Aug. 29, 2019

(65) Prior Publication Data
US 2020/0391357 A1    Dec. 17, 2020

(30) Foreign Application Priority Data
Feb. 23, 2018    (JP) .............................. JP2018-031059

(51) Int. Cl.
*B25B 11/00*    (2006.01)
(52) U.S. Cl.
CPC .................................. *B25B 11/005* (2013.01)

(58) Field of Classification Search
CPC ....... B25B 11/00; B25B 11/02; B25B 1/2421; B23Q 3/002; B23Q 3/062; B23Q 3/065;
(Continued)

(56) References Cited

U.S. PATENT DOCUMENTS 4,724,222 A * 2/1988 Feldman .............. H01L 21/6838
269/21

FOREIGN PATENT DOCUMENTS

| JP | 2002233923 A | * | 8/2002 |
| JP | 2002233923 A |   | 8/2002 |

(Continued)

OTHER PUBLICATIONS

JP-2002233923—Machine Translation (Year: 2002).*
(Continued)

*Primary Examiner* — Lee D Wilson
*Assistant Examiner* — Alberto Saenz
(74) *Attorney, Agent, or Firm* — Kanesaka Berner and Partners LLP

(57) ABSTRACT

The purpose of the present invention is to facilitate bonding between a jig and a plate-shaped workpiece and to suitably support the workpiece. A support device is provided with: a jig that has a bent support surface for supporting a plate-shaped workpiece; a first abutment that abuts against one end of the workpiece mounted on the support surface; and a second abutment that is disposed so as to face the first abutment across the support surface and that abuts against the other end of the workpiece mounted on the support surface. The first and second abutments move toward each other and apply a load, in the tangential direction load of the support surface, with respect to the workpiece mounted on the support surface.

8 Claims, 8 Drawing Sheets

(58) Field of Classification Search
CPC .... B23Q 3/069; B23Q 1/035; B23K 37/0417; B23K 37/0426; B23K 37/0435; B23K 37/0443; B23K 37/047; B64F 5/10; B64F 5/40; B64F 5/50; Y10T 29/5313; Y10T 29/53265
USPC .................. 29/559; 269/43, 266, 289 r, 291
See application file for complete search history.

(56) References Cited

FOREIGN PATENT DOCUMENTS

| | | | | |
|---|---|---|---|---|
| JP | 2004074351 | A | | 3/2004 |
| JP | 4507900 | B | | 7/2010 |
| JP | 4890424 | B | | 3/2012 |
| JP | 2012106304 | A | * | 6/2012 |
| JP | 2012106304 | A | | 6/2012 |
| JP | 5766485 | B | | 8/2015 |

OTHER PUBLICATIONS

JP-2012106304—Machine Translation (Year: 2012).*
International Search Report and Written Opinion of International Search Report PCT/JP2019/005236 dated May 21, 2019; 13pp.

* cited by examiner

WORKPIECE SUPPORTING DEVICE AND WORKPIECE SUPPORTING METHOD

RELATED APPLICATIONS

The present application is a National Phase of International Application Number PCT/JP2019/005236 filed Feb. 14, 2019 and claims priority to Japanese Application Number 2018-031059 filed Feb. 23, 2018.

TECHNICAL FIELD

The present invention relates to a workpiece supporting device and a workpiece supporting method.

BACKGROUND ART

A thin and contour-shaped skin (for example, a single contour skin having a curvature in a single direction or a double contour skin having a curvature in a plurality of directions) is used for a fuselage of an aircraft. In some cases, in order to reduce a weight of the skin, the skin used for an aircraft is subjected to processing in a plate thickness direction when processing is performed to reduce a plate thickness for an inner surface of the skin (hereinafter, referred to as "plate thickness processing"). In the related art, the plate thickness processing is performed through chemical milling. However, in recent years, the plate thickness processing through machining has been attempted owing to improved machine tool capability.

When the plate thickness processing is performed for the contour-shaped skin through the machining, it is necessary to support the skin to be in close contact with a jig. However, when the contour-shaped skin is processed into a contour shape, a shape of each skin varies. Therefore, when the plate thickness processing is performed, it is necessary to input a load to the skin so that the skin and the jig are brought into close contact with each other.

PTL 1 discloses a jig in which an upper surface of a jig main body is a suction surface formed in a rigid curved surface. A negative pressure is applied from a vacuum pump to a retractable hole disposed on the suction surface. In this manner, the jig is in close contact with the skin by causing the suction surface to suction a plate-shaped workpiece.

In addition, PTL 2 discloses a processing device having a suction unit in which the workpiece placed on and fixed to an upper surface of a frame body is suctioned toward the frame body. In the device, the suction unit includes a vacuum cup having a suction port in an upper end. The workpiece is fixed to the upper surface of the frame body by suctioning the workpiece through a suction pipe connected to the vacuum cup.

CITATION LIST

Patent Literature

[PTL 1] Japanese Patent No. 5766485
[PTL 2] Japanese Patent No. 4890424

SUMMARY OF INVENTION

Technical Problem

Incidentally, in general, when a skin is processed into a contour shape, if the skin is curved once to have a large curvature, it is difficult to reduce the curvature of the skin in that state. Accordingly, the skin is processed to have a curvature smaller than a desired curvature. Therefore, when the skin processed into the contour shape is supported by a jig in order to perform plate thickness processing, there is a possibility that a central portion of the skin placed on the jig may float (that is, the skin and the jig may be in a separated state). Therefore, as in the devices disclosed in PTL 1 and PTL 2, in order to bring the workpiece into close contact with the jig, it is necessary to eliminate the floating of the central portion and to bring the central portion of the workpiece into contact with the jig. In order to eliminate the floating of the central portion, it is conceivable to input a load to the skin in a plate thickness direction. However, in a case where the load is applied to the skin in the plate thickness direction, there is a possibility that the following problems may occur.

First, in order to apply the load to the skin in the plate thickness direction, gravity is used. Accordingly, the load requires many weights. In addition, when the load is applied to the skin in the plate thickness direction, friction is generated between the skin and the jig. When the friction is generated, a sliding movement of the skin on the jig is hindered by the friction. Accordingly, the skin is less likely to deform. As a result, more loads are required to bring the jig and the skin into close contact with each other. In addition, when the load is applied to a thin plate-shaped skin in the plate thickness direction, it is difficult to uniformly apply the load to an entire area of the skin. When a portion of the skin is pressed in the plate thickness direction, there is a possibility that other portion may float due to a reaction thereof. When other portions float, it is necessary to press the floating portion again. Accordingly, the number of steps increases.

Due to these problems, there is a possibility that the workpiece for supporting the skin may be complicated.

The present invention is made in view of the above-described circumstances, and an object thereof is to provide a workpiece supporting device and a workpiece supporting method, in which a jig and a plate-shaped workpiece can be easily brought into close contact with each other so as to preferably support the workpiece.

Solution to Problem

In order to solve the above-described problems, a workpiece supporting device and a workpiece supporting method according to the present invention employ the following means.

According to a first aspect of the present invention, there is provided a workpiece supporting device for supporting a plate-shaped workpiece. The workpiece supporting device includes a jig having a curved supporting surface for supporting the workpiece, a first contact member disposed in the jig, and coming into contact with one end portion which is an end portion in one direction of the workpiece placed on the supporting surface, and a second contact member disposed in the jig to face the first contact member across the supporting surface, and coming into contact with the other end portion in the one direction of the workpiece placed on the supporting surface. At least one of the first contact member and the second contact member moves toward the other so that a load in a tangential direction of the supporting surface is input to the workpiece placed on the supporting surface.

According to the above-described configuration, at least one of the first contact member and the second contact member moves toward the other so that the load in the tangential direction of the supporting surface is input to the workpiece. That is, the plate-shaped workpiece is interposed between the first contact member and the second contact member, and the workpiece is pressed in a direction intersecting a plate thickness direction. In this manner, a compressive load is input to the workpiece. When the load in the tangential direction is input to the workpiece, a horizontal component force and a vertical component force are applied to the workpiece. Since the vertical component force is applied to the workpiece, the plate-shaped workpiece deforms in a direction in which the plate-shaped workpiece comes into contact with the supporting surface of the jig. Accordingly, the curved supporting surface of the jig and the workpiece can be brought into close contact with each other. Therefore, the workpiece can be preferably supported in a state where a curved shape of the workpiece is maintained. Accordingly, for example, in a case where processing such as plate thickness processing is performed on an exposed surface of the workpiece (that is, a surface opposite to a surface in contact with the supporting surface of the jig), processing work can be preferably carried out while the curved shape of the workpiece is maintained.

In addition, when the load is input to the workpiece in the plate thickness direction, friction is generated between the supporting surface and the workpiece in a contact portion between the supporting surface of the jig and the workpiece. When the friction is generated, a sliding movement of the workpiece on the supporting surface is hindered by a frictional force. Accordingly, the workpiece is less likely to deform. In addition, the friction generated between the supporting surface and the workpiece increases as the load applied to the workpiece increases in the plate thickness direction. Therefore, there is a possibility that the load applied to the workpiece in the plate thickness direction may have increasing energy loss. According to the above-described configuration, the load is input to the workpiece in the tangential direction of the supporting surface. Accordingly, compared to a case where the load is input in the plate thickness direction, it is possible to suppress the friction generated between the supporting surface and the workpiece. Therefore, the supporting surface and the workpiece can be easily brought into close contact with each other, and the plate-shaped workpiece can be preferably supported.

In addition, the load is input to the workpiece in the tangential direction. Accordingly, the load can be uniformly applied to the whole workpiece. In this manner, for example, when a portion of the workpiece is pressed, it is possible to prevent a situation in which the other portion floats due to a reaction thereof. Therefore, the supporting surface and the workpiece can be easily brought into close contact with each other.

In addition, the workpiece supporting device according to the first aspect of the present invention may further include a third contact member disposed in the jig, and coming into contact with one end portion which is an end portion in an intersecting direction intersecting the one direction of the workpiece placed on the supporting surface, and a fourth contact member disposed in the jig to face the third contact member across the supporting surface, and coming into contact with the other end portion in the intersecting direction of the workpiece placed on the supporting surface. At least one of the third contact member and the fourth contact member may move toward the other so that the load in the tangential direction of the supporting surface which is the intersecting direction is input to the workpiece placed on the supporting surface.

According to the above-described configuration, at least one of the third contact member and the fourth contact member moves toward the other. In this manner, the load can be input to the workpiece in the direction intersecting the direction of the load input by the first contact member and the second contact member. In this way, the load in the tangential direction of the supporting surface can be input in a plurality of directions. Therefore, the plate-shaped workpiece can be preferably supported in a state having a complicated curved shape such as a double curved shape.

According to a second aspect of the present invention, there is provided a workpiece supporting device for supporting a plate-shaped workpiece. The workpiece supporting device includes a jig having a curved supporting surface for supporting the workpiece, a first clamp portion disposed in the jig, and clamping one end portion which is an end portion in one direction of the workpiece placed on the supporting surface, and a second clamp portion disposed in the jig to face the first clamp portion across the supporting surface, and clamping the other end portion in the one direction of the workpiece placed on the supporting surface. At least one of the first clamp portion and the second clamp portion moves in a direction away from the other so that a load in a tangential direction of the supporting surface is input to the workpiece placed on the supporting surface.

According to the above-described configuration, at least one of the first clamp portion and the second clamp portion moves toward the other so that the load in the tangential direction of the supporting surface is input to the workpiece. That is, the workpiece is pulled by the first clamp portion and the second clamp portion in the direction intersecting the plate thickness direction. In this manner, tension is input to the workpiece. When the load in the tangential direction is input to the workpiece, a horizontal component force and a vertical component force are applied to the workpiece. Since the vertical component force is applied to the workpiece, the plate-shaped workpiece deforms in a direction in which the plate-shaped workpiece comes into contact with the supporting surface of the jig. Accordingly, the curved supporting surface of the jig and the workpiece can be brought into close contact with each other. Therefore, a plate-shaped workpiece can be preferably supported. Accordingly, for example, in a case where processing such as plate thickness processing is performed on an exposed surface of the workpiece (that is, a surface opposite to a surface in contact with the supporting surface of the jig), processing work can be preferably carried out.

In addition, the load is input to the workpiece in the tangential direction of the supporting surface. Accordingly, compared to a case where the load is input in the plate thickness direction, it is possible to suppress the friction generated between the supporting surface and the workpiece. Therefore, the supporting surface and the workpiece can be easily brought into close contact with each other, and the plate-shaped workpiece can be preferably supported.

In addition, the workpiece supporting device according to the first and second aspects of the present invention may further include determination means disposed on the supporting surface to determine whether the supporting surface and the workpiece are in contact with each other.

According to the above-described configuration, the determination unit can determine whether or not the supporting surface and the workpiece are in contact with each other. In this manner, when it is determined that the supporting surface and the workpiece are in contact with each other, in a case of stopping a movement of the contact member, it is possible to prevent an excessive load from being input to the workpiece.

According to the first aspect of the present invention, there is provided a workpiece supporting method for supporting a plate-shaped workpiece by using a supporting device including a jig having a curved supporting surface for supporting the workpiece, a first contact member disposed in the jig, and coming into contact with one end portion which is an end portion in one direction of the workpiece placed on the supporting surface, and a second contact member disposed in the jig to face the first contact member across the supporting surface, and coming into contact with the other end portion in the one direction of the workpiece placed on the supporting surface. The workpiece supporting method includes a placement step of placing the workpiece on the supporting surface, a first contact step of bringing the one end portion of the workpiece and the first contact member into contact with each other, a second contact step of bringing the other end portion of the workpiece and the second contact member into contact with each other, and a first moving step of moving at least one of the first contact member and the second contact member toward the other so that a load in a tangential direction of the supporting surface is input to the workpiece placed on the supporting surface.

In addition, in the workpiece supporting method according to the first aspect of the present invention, the supporting device may include a third contact member disposed in the jig, and coming into contact with one end portion which is an end portion in an intersecting direction intersecting the one direction of the workpiece placed on the supporting surface, and a fourth contact member disposed in the jig to face the third contact member across the supporting surface, and coming into contact with the other end portion in the intersecting direction of the workpiece placed on the supporting surface. The workpiece supporting method may further include a second moving step of moving at least one of the third contact member and the fourth contact member toward the other so that the load in the tangential direction of the supporting surface is input to the workpiece placed on the supporting surface.

According to the second aspect of the present invention, there is provided a workpiece supporting method for supporting a plate-shaped workpiece by using a supporting device including a jig having a curved supporting surface for supporting the workpiece, a first clamp portion disposed in the jig, and clamping one end portion which is an end portion in one direction of the workpiece placed on the supporting surface, and a second clamp portion disposed in the jig to face the first clamp portion across the supporting surface, and clamping the other end portion in the one direction of the workpiece placed on the supporting surface. The workpiece supporting method includes a placement step of placing the workpiece on the supporting surface, a first clamping step of clamping the one end portion of the workpiece by using the first clamp portion, a second clamping step of clamping the other end portion of the workpiece by using the second clamp portion, and a moving step of moving at least one of the first clamp portion and the second clamp portion in a direction away from each other so that a tensile load in a tangential direction of the supporting surface is input to the workpiece placed on the supporting surface.

In addition, the workpiece supporting method according to the first and second aspects of the present invention may further include a step of determining whether or not the supporting surface and the workpiece are in contact with each other by using determination means disposed on the supporting surface.

Advantageous Effects of Invention

According to the present invention, the jig and the workpiece can be easily brought into close contact with each other, and the plate-shaped workpiece can be preferably supported.

BRIEF DESCRIPTION OF DRAWINGS

FIG. 5A illustrates a state before the workpiece and a supporting surface are in close contact with each other, and FIG. 5B illustrates a state after the workpiece and the supporting surface are in close contact with each other.

DESCRIPTION OF EMBODIMENTS

Hereinafter, embodiments of a workpiece supporting device and a workpiece supporting method according to the present invention will be described with reference to the drawings.

First Embodiment

Hereinafter, a first embodiment of the present invention will be described with reference to FIGS. 1 to 8.

Figure 1:
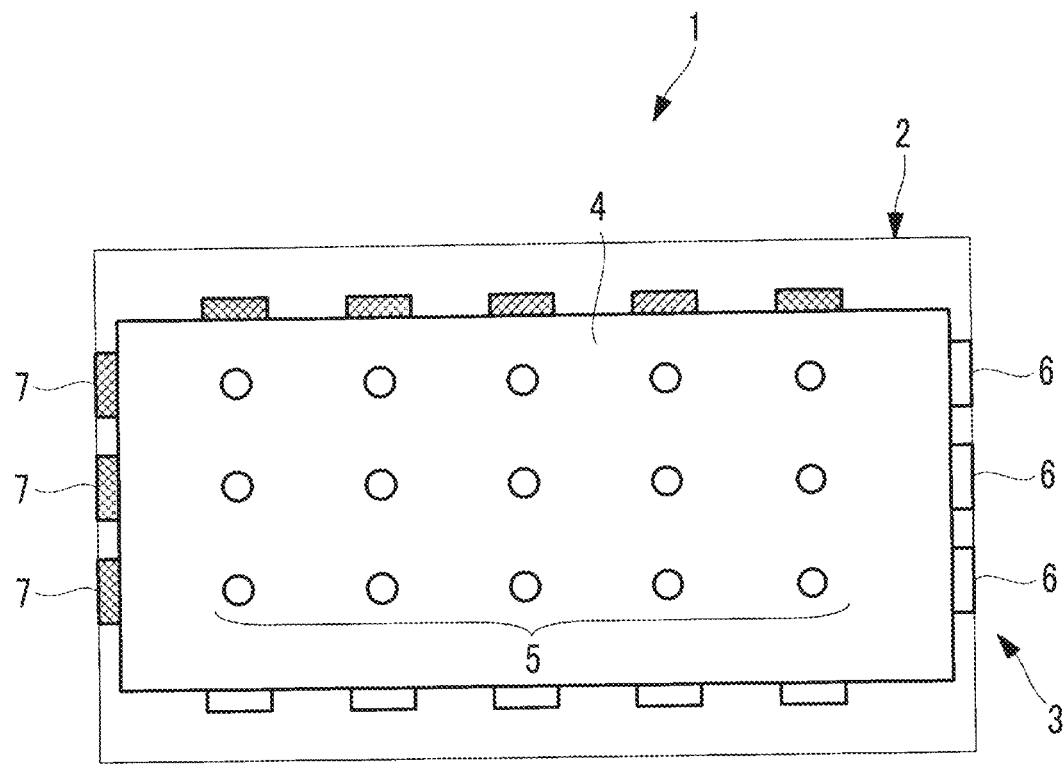
FIG. 1 is a schematic top view of a supporting device according to a first embodiment of the present invention.
Figure 2:
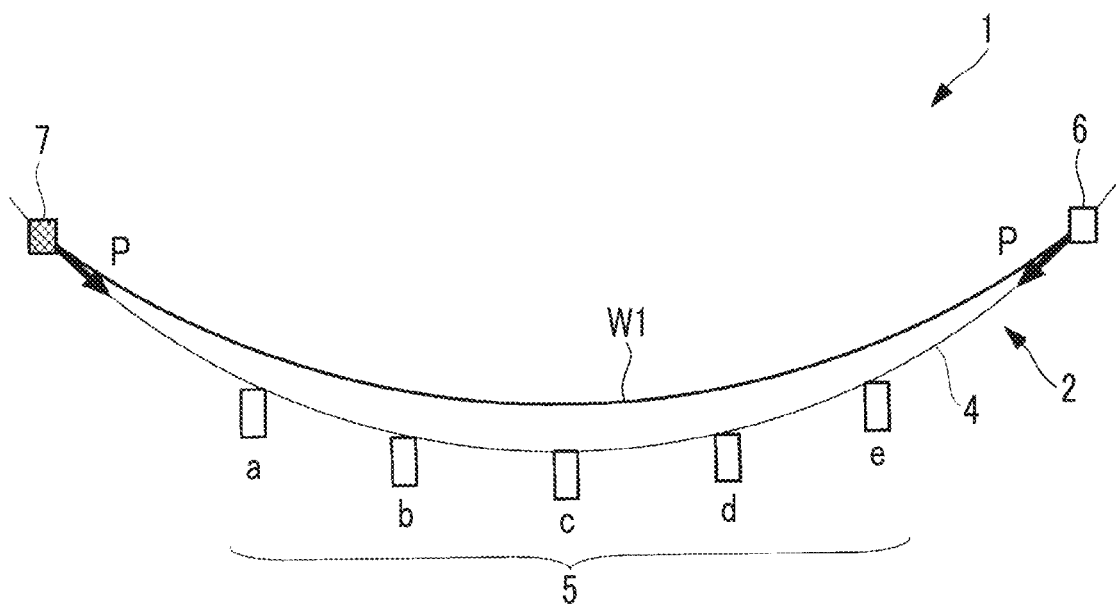
FIG. 2 is a schematic sectional view of the supporting device in FIG. 1.

As illustrated in FIGS. 1 and 2, a supporting device 1 according to the present embodiment supports a plate-shaped workpiece (workpiece) W1. As illustrated in FIG. 2, the workpiece W1 according to the present embodiment is a so-called single contour skin in which a plate-shaped member is curved in advance to have a curvature in a predetermined direction, and a cross section thereof is formed in a substantially arc shape. The workpiece W1 is supported by the supporting device 1 so that a protruding surface is located downward.

As illustrated in FIG. 1, the supporting device 1 includes a jig 2 that supports the workpiece W1 and a pressing portion 3 that presses the workpiece W1 supported by the jig 2. In addition, the supporting device 1 includes a control device (not illustrated) for transmitting and receiving information to and from the jig 2 and the pressing portion 3.

The jig 2 has a curved supporting surface 4 that supports the workpiece W1, and supports the workpiece W1 from below by using the supporting surface 4. The supporting surface 4 is a surface curved to be recessed downward, and a cross section thereof is formed in a substantially arc shape (refer to FIG. 2). In addition, the jig 2 includes a suction portion (not illustrated) that suctions the workpiece W1 into the supporting surface 4 by suctioning the workpiece W1 in a direction of the supporting surface 4, and a sensor (determination means) 5 that determines whether or not the supporting surface 4 and the workpiece W1 are in contact with each other.

The suction portion has a plurality of suction holes (not illustrated) open on the supporting surface 4. The plurality of suction holes are open at a substantially equal interval over a substantially entire area of the supporting surface 4. A negative pressure is applied from a vacuum pump (not illustrated). In this manner, the suction holes suction the workpiece W1 into the supporting surface 4 in a vacuum state.

The sensor 5 is disposed along the supporting surface 4. In addition, the sensors 5 are disposed at a substantially equal interval over a substantially entire area of the supporting surface 4. For example, as illustrated in FIGS. 1 and 2, five sensors 5 are aligned in a direction having a curvature of the supporting surface 4. In addition, the number (three in the present embodiment) of the sensors 4 corresponding to a length thereof is disposed in a direction orthogonal to the direction having the curvature. Each of the sensors 5 is a so-called gap sensor, and determines whether or not the workpiece W1 and the supporting surface 4 are in contact with each other at a location having each of the sensors 5. In addition, each of the sensors 5 transmits acquired information to the control device.

Figure 3:
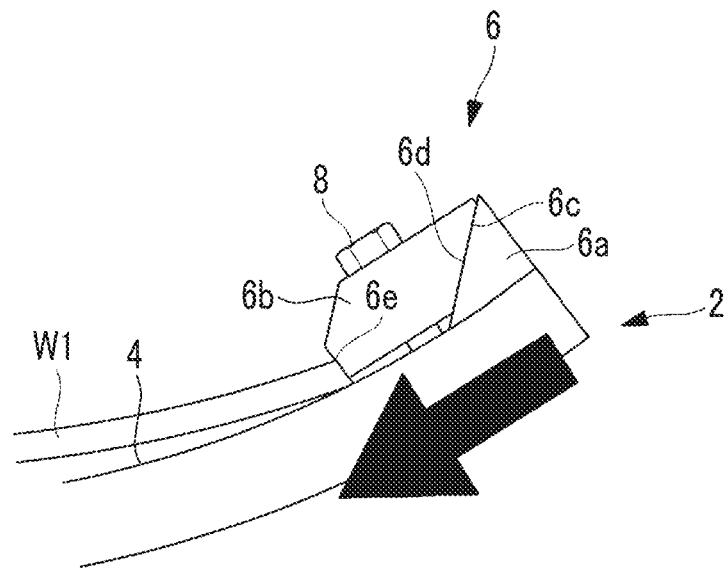
FIG. 3 is a schematic side view of a pressing portion of the supporting device in FIG. 1.

As illustrated in FIGS. 2 and 3, the pressing portion 3 includes a first contact member 6 that comes into contact with one end of the workpiece W1, and a second contact member 7 that comes into contact with the other end of the workpiece W1. The first contact member 6 and the second contact member 7 are respectively disposed in end portions of the jig 2 to face each other across the supporting surface 4. In addition, a plurality of (three in the present embodiment) the pressing portions 3 are provided, and the plurality of pressing portions 3 are disposed at a substantially equal interval in a direction orthogonal to the direction having the curvature.

The first contact member 6 and the second contact member 7 have substantially the same structure. Accordingly, a structure of the first contact member 6 will be described herein, and a detailed structure of the second contact member 7 will be omitted in the description. As illustrated in FIG. 3, the first contact member 6 has a fixed portion 6a fixed to the jig 2 and a moving portion 6b that slidably engages with the fixed portion 6a. The fixed portion 6a has an inclined surface 6c inclined to be closer to the workpiece W1 as a surface on the workpiece W1 side (that is, on the supporting surface 4 side) faces downward. A lower end of the inclined surface 6c is in contact with the supporting surface 4 of the jig 2. The moving portion 6b has a sliding surface 6d that slides along the inclined surface 6c of the fixed portion 6a, and a contact surface 6e that comes into contact with a cross section of the plate-shaped workpiece W1. In addition, a bolt hole (not illustrated) is formed in the moving portion.

The first contact member 6 tightens a bolt 8 that is inserted into the bolt hole formed in the moving portion 6b. In this manner, an axial force of the bolt 8 causes the sliding surface 6d of the moving portion 6b to slide on the inclined surface 6c of the fixed portion 6a. When the sliding surface 6d of the moving portion 6b slides, the moving portion 6b moves in a direction of the second contact member 7 along the supporting surface 4 of the jig 2. When the moving portion 6b moves, the moving portion 6b presses the cross section of the workpiece W1 with which the moving portion 6b is in contact. In this way, the first contact member 6 changes the axial force of the bolt 8 into a pressing force for pressing the workpiece W1.

When the moving portion 6b presses the cross section of the workpiece W1 along the supporting surface 4 of the jig 2, the workpiece W1 is interposed between the first contact member 6 and the second contact member 7. Accordingly, a load in a tangential direction of the supporting surface 4 is input to the workpiece W1.

Figure 4:
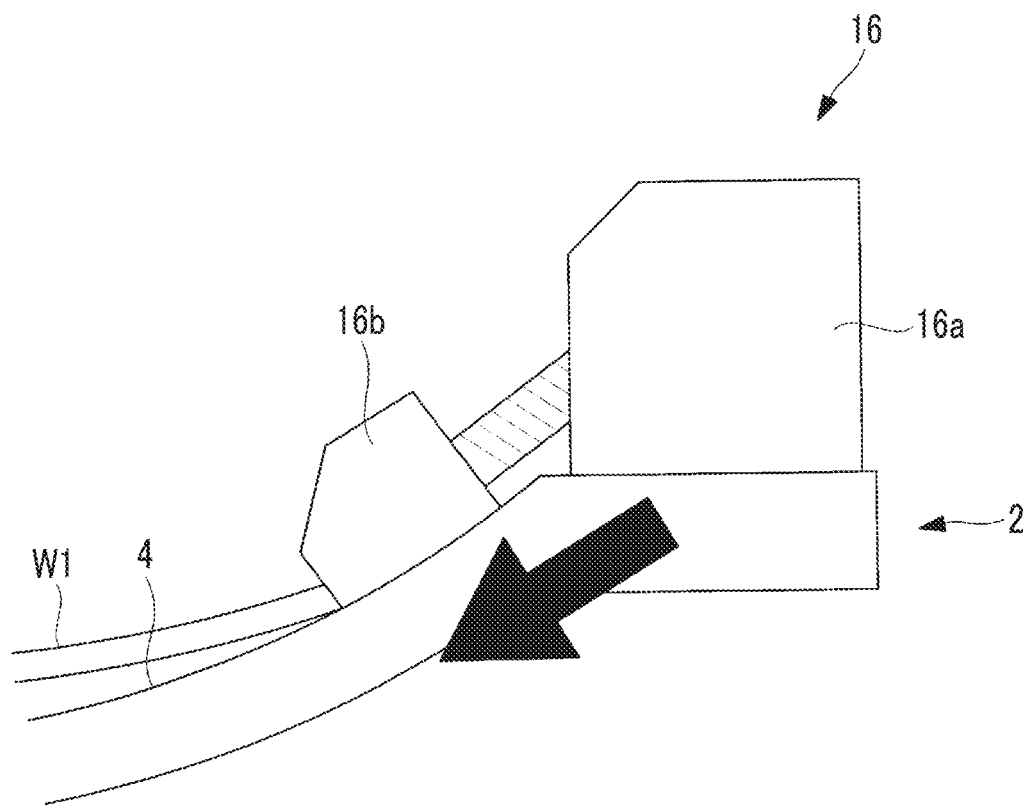
FIG. 4 is a schematic sectional view illustrating a modification example of FIG. 3.

A configuration of the first contact member 6 and the second contact member 7 is not limited thereto. For example, as illustrated in FIG. 4, the first contact member 16 may have a main body portion 16a fixed to the jig 2, and a moving portion 16b that moves in a direction of the second contact member along the supporting surface 4 of the jig 2 by using a hydraulic pressure applied from the main body portion 16a. In this configuration, the moving portion 16b is in contact with the workpiece W1, and presses the workpiece W1 since the moving portion 16b moves by using the hydraulic pressure.

The control device drives the first contact member 6 and the second contact member 7, based on information transmitted from the sensor 5.

In addition, for example, the control device is configured to include, a central processing unit (CPU), a random access memory (RAM), a read only memory (ROM), and a computer-readable storage medium. Then, as an example, a series of processes for realizing various functions are stored in a storage medium in a form of a program. The CPU reads the program in the RAM, and executes information processing and arithmetic processing. In this manner, various functions are realized. The program may adopt a form in which the program is installed in advance in the ROM or another storage medium, a form in which the program is provided in a stored state in a computer-readable storage medium, or a form in which the program is delivered via wired or wireless communication means. The computer-readable storage medium is a magnetic disc, a magneto-optical disc, a CD-ROM, a DVD-ROM, or a semiconductor memory.

Next, a method of supporting the workpiece W1 in the jig 2 will be described with reference to FIGS. 2 and 5.

In the present embodiment, first, the plate-shaped workpiece W1 curved in advance into a substantially arc shape in cross section is placed on the supporting surface 4 of the jig 2 by a transport device (not illustrated) such as a crane (placement step). When the workpiece W1 is placed, the workpiece W1 is placed so that a curved shape of the workpiece W1 and a curved shape of the supporting surface 4 correspond to each other. When the workpiece W1 is curved once to have a large curvature, it is difficult to reduce the curvature in that state. Accordingly, the workpiece W1 is curved to have a curvature smaller than a desired curvature.

Figure 5A:
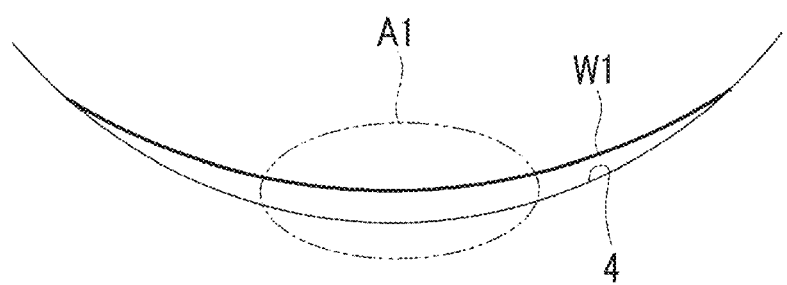
FIGS. 5A-5B are schematic sectional view illustrating a supporting mode of a workpiece when the supporting device in FIG. 1 is used.

Therefore, as illustrated in FIGS. 2 and 5(a), both end portions of the workpiece W1 placed on the supporting surface 4 come into contact with the supporting surface 4, and a substantially central portion is in a separated state from the supporting surface 4 of the jig 2 (refer to a region A in FIG. 5(a)).

In addition, when the workpiece W1 is placed on the supporting surface 4, the workpiece W1 is placed to be in contact with the first contact member 6 fixed to the jig 2 (first contact step). That is, the workpiece W1 is positioned, based on the first contact member 6. After the workpiece W1 is placed to be in contact with the first contact member 6, the second contact member 7 is brought into contact with the workpiece W1 (second contact step).

Next, the control device moves the second contact member 7 in a direction in which the first contact member 6 is disposed (first moving step). When the second contact member 7 moves, a load is input to the workpiece W1 from the second contact member 7 side. At this time, the first contact member 6 is not moved. When the second contact member 7 is moved and the load is input to the workpiece W1, the workpiece W1 deforms. A deformation amount of the workpiece W1 is maximized in a central portion farthest from each contact member. Therefore, first, the control device moves the second contact member 7 until a sensor c disposed in the central portion of the supporting surface 4 among the five sensors 5 determines that the workpiece W1 and the supporting surface 4 are in contact with each other.

When the sensor c determines that the workpiece W1 and the supporting surface 4 are in contact with each other (determination step), the control device subsequently determines whether or not a sensor a and a sensor b which are disposed on the second contact member 7 side from the sensor c determine that the workpiece W1 and the supporting surface 4 are in contact with each other. Then, in a case where any one of the sensor a and the sensor b determines that the workpiece W1 and the supporting surface 4 are not in contact with each other, the control device further moves the second contact member 7 so that the load is input to the workpiece W1. At this time, the control device moves the second contact member 7 until the sensor a and the sensor b determine that the workpiece W1 and the supporting surface 4 are in contact with each other.

When the sensor a and the sensor b determine that the workpiece W1 and the supporting surface 4 are in contact with each other, the control device subsequently determines whether or not a sensor d and a sensor e which are disposed on the first contact member 6 side from the sensor c determine that the workpiece W1 and the supporting surface 4 are in contact with each other. In a case where any one of the sensor d and the sensor e determines that the workpiece W1 and the supporting surface 4 are not in contact with each other, the control device moves the first contact member 6 so that the load is input to the workpiece W1. At this time, the control device moves the first contact member 6 until the sensor d and the sensor e determine that the workpiece W1 and the supporting surface 4 are in contact with each other.

Figure 5B:
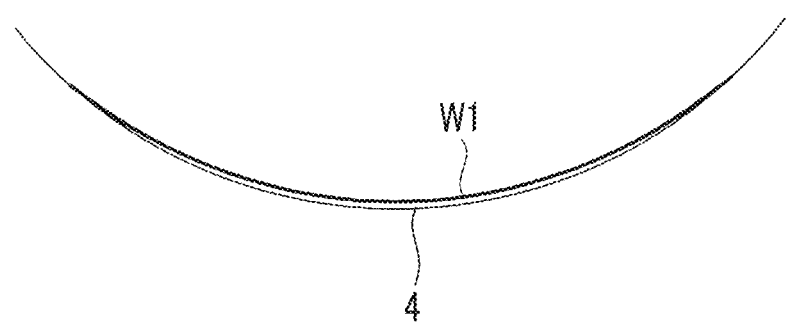

In a case where all of the sensors determine that the workpiece W1 and the supporting surface 4 are in contact with each other, the first contact member 6 and the second contact member 7 are stopped. The first contact member 6 and the second contact member 7 are fixed so that a state of the workpiece W1 is maintained in a current state. In this way, as illustrated in FIG. 5(b), the workpiece W1 and the supporting surface 4 are in a state where both of these are in close contact with each other in all regions. In FIG. 5(b), it seems that a gap is slightly formed between the workpiece W1 and the supporting surface 4 for the sake of the illustration. However, actually, the workpiece W1 and the supporting surface 4 are in close contact with each other without any gap therebetween.

Next, the control device drives a vacuum pump to suction the workpiece W1 into the supporting surface 4 in a vacuum state. In this way, the workpiece W1 is suctioned by the suction portion. Accordingly, the workpiece W1 and the supporting surface 4 can be more firmly brought into close contact with each other.

In this way, the supporting surface 4 and the workpiece W1 are brought into close contact with each other so that the plate-shaped workpiece W1 is supported by the supporting device 1.

In the workpiece W1 supported by the supporting device 1, an exposed surface (that is, an inner peripheral surface curved in an arc shape) is subjected to processing in the plate thickness direction by a machine cutting device (not illustrated) so as to reduce the plate thickness (hereinafter referred to as "plate thickness processing").

According to the present embodiment, the following operational effects can be achieved.

In the present embodiment, the first contact member 6 and the second contact member 7 move toward the other. In this manner, the load in the tangential direction of the supporting surface 4 having an arc-shaped cross section is input to the plate-shaped workpiece W1. That is, the plate-shaped workpiece W1 is interposed between the first contact member 6 and the second contact member 7, and the workpiece W1 is pressed in a direction intersecting the plate thickness direction. In this manner, a compressive load is input to the workpiece W1. When a load P in the tangential direction is input to the workpiece W1 (load in a direction of an arrow P in FIG. 7, in the present embodiment, a load in a direction of an angle φ with respect to a vertical direction), a horizontal component force (arrow h in FIG. 7) and a vertical component force (arrow v in FIG. 7, in the present embodiment, Pcosφ) are applied to the workpiece W1. Since the vertical component force is applied to the workpiece W1, the plate-shaped workpiece W1 deforms in a direction in which the workpiece W1 comes into contact with the supporting surface 4 of the jig 2. Accordingly, the curved supporting surface 4 of the jig 2 and the workpiece W1 can be brought into close contact with each other. Therefore, according to the supporting device 1 and the supporting method of the present embodiment, the workpiece W1 can be preferably supported while the curved shape of the workpiece W1 is maintained. Accordingly, when the processing such as the plate thickness processing is performed on the exposed surface (that is, a surface opposite to a surface in contact with the supporting surface 4 of the jig 2) of the workpiece W1, processing work can be preferably carried out in a state where the curved shape of the workpiece W1 is maintained.

Figure 6:
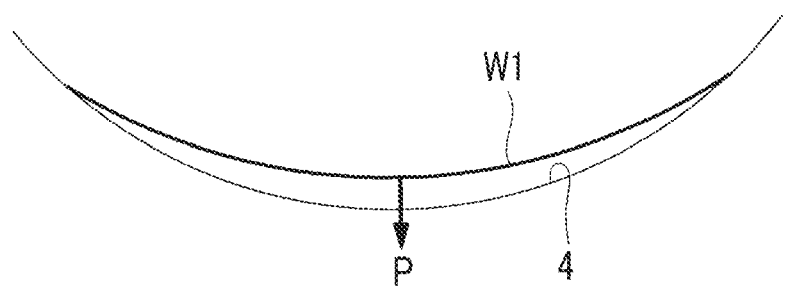
FIG. 6 is a schematic sectional view illustrating a state where a load is input to the workpiece in a plate thickness direction.
Figure 7:
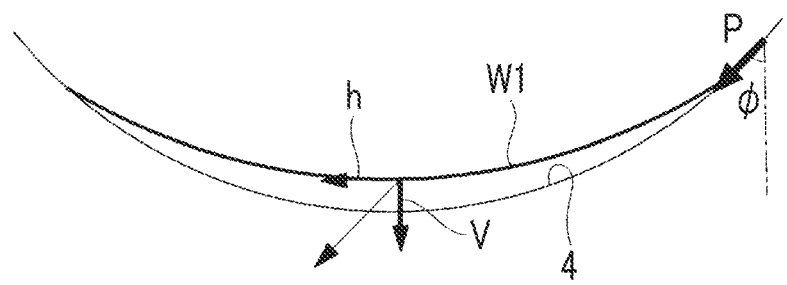
FIG. 7 is a schematic sectional view illustrating a state where a load is input to the workpiece in a tangential direction.

In addition, as illustrated in FIG. 6, when the load (load in a direction of the arrow P in FIG. 6) is input to the workpiece W1 in the plate thickness direction, friction is generated between the supporting surface 4 and the workpiece W1 in a contact portion between the supporting surface 4 of the jig 2 and the workpiece W1. When the friction is generated, a sliding movement of the workpiece W1 on the supporting surface 4 is hindered by a frictional force. Accordingly, the workpiece W1 is less likely to deform. In addition, the friction generated between the supporting surface 4 and the workpiece W1 increases as the load applied to the workpiece W1 increases in the plate thickness direction. Therefore, there is a possibility that the load applied to the workpiece W1 in the plate thickness direction may have increasing energy loss. In the present embodiment, the load is input to the workpiece W1 in the tangential direction of the supporting surface 4. Accordingly, compared to a case where the load is input in the plate thickness direction, it is possible to suppress the friction generated between the supporting surface 4 and the workpiece W1. Therefore, the supporting surface 4 and the workpiece W1 can be easily brought into close contact with each other, and the plate-shaped workpiece W1 can be preferably supported.

In the present embodiment, since the sensor 5 is provided, the sensor 5 can determine whether or not the supporting surface 4 and the workpiece W1 are in contact with each other. In addition, in the present embodiment, when all of the sensors 5 determine that the supporting surface 4 and the workpiece W1 are in contact with each other, a movement of the first contact member 6 and the second contact member 7 is stopped. Therefore, it is possible to prevent an excessive load from being input to the workpiece W1.

In addition, the first contact member 6 and the second contact member 7 are fixed so that the first contact member 6 and the second contact member 7 maintain a state of the workpiece W1 at a current state. In this way, in the present embodiment, even in a state where the workpiece W1 and the supporting surface 4 are in close contact with each other, the load in the tangential direction is input to the workpiece W1 so that a load in the vertical direction is applied to the workpiece W1. Accordingly, it is possible to suppress a situation in which the close contact between the workpiece W1 and the supporting surface 4 is released while the plate thickness processing is performed. In other words, in the present embodiment, the load is input from both end portions of the plate-shaped workpiece W1 so that the workpiece W1 and the supporting surface 4 are brought into close contact with each other. Accordingly, when an inner peripheral surface of the workpiece W1 is processed, the supporting device 1 (particularly, a structure for applying the load in the vertical direction to the plate-shaped workpiece W1) does not interfere with the workpiece W1. Therefore, the plate thickness processing can be performed while the load is applied in a direction in which the workpiece W1 and the supporting surface 4 are brought into close contact with each other. Accordingly, it is possible to suppress a situation in which the close contact between the workpiece W1 and the supporting surface 4 is released while the plate thickness processing is performed. Therefore, the processing work can be preferably carried out.

In addition, as described above, when the plate-shaped workpiece W1 is placed on the supporting surface 4, a substantially central portion of the workpiece W1 is in a separated state from the supporting surface 4 of the jig 2. A device such as a clamp is less likely to be disposed in the central portion of the plate-shaped workpiece W1. Accordingly, in a structure in which the load is applied in the plate thickness direction, the load is applied by using gravity such as placing a weight in the central portion. In the present embodiment, the load is input to the plate-shaped workpiece W1 from the end portion. Accordingly, the load can be input by a pressing device using the axial force of the bolt or the hydraulic pressure. Therefore, a higher load can be input to the plate-shaped workpiece W1. Accordingly, close contact capability between the workpiece W1 and the supporting surface 4 can be further improved. Therefore, processing accuracy during the plate thickness processing can be improved. In addition, a higher load can be input to the plate-shaped workpiece W1. Accordingly, even if the plate-shaped workpiece is thick, the workpiece and the supporting surface 4 can be brought into close contact with each other.

In a case where a device capable of inputting a high load, such as a device using the axial force of the bolt or the hydraulic pressure is used for the plate-shaped workpiece W1, the plate-shaped workpiece W1 has low rigidity against the load in the plate thickness direction. Therefore, there is a possibility that the workpiece W1 may deform into an unintended shape. Therefore, according to the load in the plate thickness direction, in order to avoid this possibility, the plate-shaped workpiece W1 cannot be pressed by using a high load. On the other hand, in the present embodiment, the load is input from the end portion of the workpiece W1 (that is, in the tangential direction of the supporting surface 34). In this manner, a high load can be input to the workpiece W1 while the workpiece W1 is prevented from deforming into the unintended shape.

In addition, the load is input to the workpiece W1 in the tangential direction. Accordingly, the load can be uniformly applied to the whole workpiece W1. In this manner, for example, when a portion of the workpiece W1 is pressed, it is possible to prevent a situation in which the other portion floats due to a reaction thereof. Therefore, the supporting surface 34 and the workpiece W1 can be easily brought into close contact with each other.

In addition, according to a device in which the skin is supported in the jig only by using a suction force, the skin cannot be reliably held only by using a vacuum pressure, and there is a possibility that the skin may float. Consequently, the plate thickness processing cannot be preferably performed, and there is a possibility that the plate thickness may vary after the plate thickness processing. In addition, in a case where finishing is performed in order to prevent variations in the plate thickness while the plate thickness is confirmed in a semi-finished state during the plate thickness processing, there is a possibility that a processing time may increase.

In the present embodiment, as described above, the workpiece and the supporting surface 4 can be brought into close contact with each other. Therefore, it is possible to suppress variations in the plate thickness after the plate thickness processing. In addition, since variations are suppressed, it is not necessary to confirm the plate thickness in the semi-finished state during the plate thickness processing. Therefore, it is possible to suppress an increase in the processing time.

In the present embodiment, an example has been described in which the workpiece W1 is suctioned by the suction portion after the workpiece W1 is pressed by the pressing portion 3 so that the workpiece W1 and the supporting surface 4 are brought into close contact with each other. However, a method other than the method according to the present embodiment is also conceivable as the workpiece supporting method using the pressing portion and the suction portion. For example, as the workpiece supporting method using the pressing portion and the suction portion, a method is also conceivable in which the workpiece is pressed by the pressing portion after the workpiece is suctioned by the suction portion.

Figure 8A:
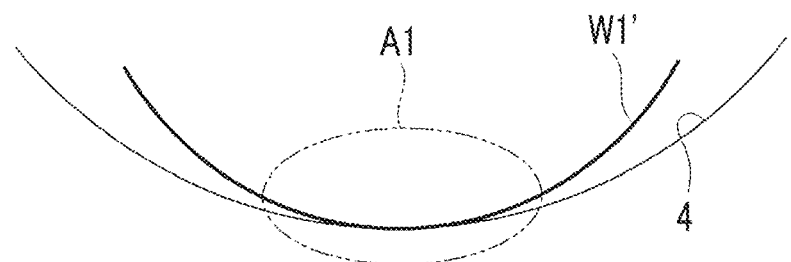
FIGS. 8A-8C are schematic sectional view illustrating a modification example of FIGS. 5A-5B.
Figure 8A:
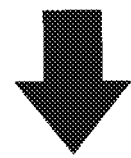

Specifically, as illustrated in FIG. 8, first, when a plate-shaped workpiece W1' curved in advance into a substantially arc shape in cross section is placed on the supporting surface 4 of the jig 2 by using a transport device such as a crane, the central portion of the plate-shaped workpiece W1' and the central portion of the supporting surface 4 are brought into close contact with each other, and the plate-shaped workpiece W1' is suctioned (region A in FIG. 8(a)). When the plate-shaped workpiece W1 is lifted by the transport device such as the crane, the plate-shaped workpiece W1' elastically deforms to increase the curvature. In this manner, the curvature of the plate-shaped workpiece W1' temporarily increases than the curvature of the supporting surface 4 of the jig 2. Accordingly, the central portion of the plate-shaped workpiece W1' and the central portion of the supporting surface 4 can be brought into close contact with each other, and the plate-shaped workpiece W1' can be suctioned.

Figure 8B:
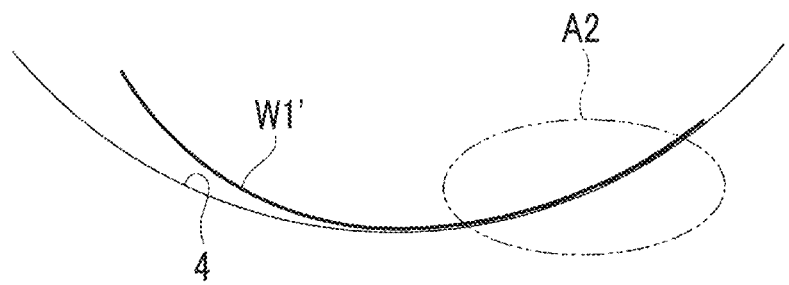
Figure 8B:
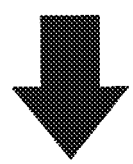

Next, an outer edge portion on the first contact member 6 side of the workpiece W1' is brought into close contact with the supporting surface 4, and the location is suctioned by the suction portion (refer to FIG. 8(b)). At this time, elasticity of the plate-shaped workpiece W1' is utilized. Accordingly, it is possible to reduce the load applied when both of these are brought into close contact with each other.

Figure 8C:
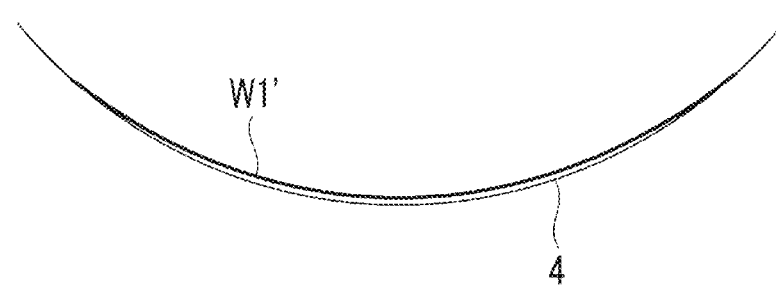

Next, an outer edge portion A2 on the second contact member 7 side of the workpiece W1 is brought into close contact with the supporting surface 4, and the location is suctioned by the suction portion. Then, as illustrated in FIG. 8(c), the second contact member 7 and/or the first contact member 6 are moved in a state where the workpiece W1' is suctioned in all regions. In this manner, the workpiece W1' and the supporting surface 4 are brought into close contact with each other by inputting the load in the tangential direction to the workpiece W1'.

In this way, it is also conceivable to adopt a method of supporting the workpiece in which the workpiece is pressed by the pressing portion after the workpiece is suctioned by the suction portion.

Even according to this method, the workpiece W1' can be supported. However, according to this method, the workpiece W1' needs to be deformed by using the crane. Consequently, the work is somewhat complicated, and a mechanism for deforming the workpiece W1' needs to be disposed in the crane. Therefore, there is a possibility that the cost may increase.

In contrast, according to the method of the present embodiment, as described above, the workpiece W1 may be only placed on the supporting surface 4 of the jig 2. Accordingly, no special work needs to be carried out using the crane. Therefore, compared to a method in which the workpiece W1 is pressed by the pressing portion after the workpiece W1 is suctioned by the suction portion, the work can be simplified, and an increase in the cost can be suppressed.

Second Embodiment

Figure 9:
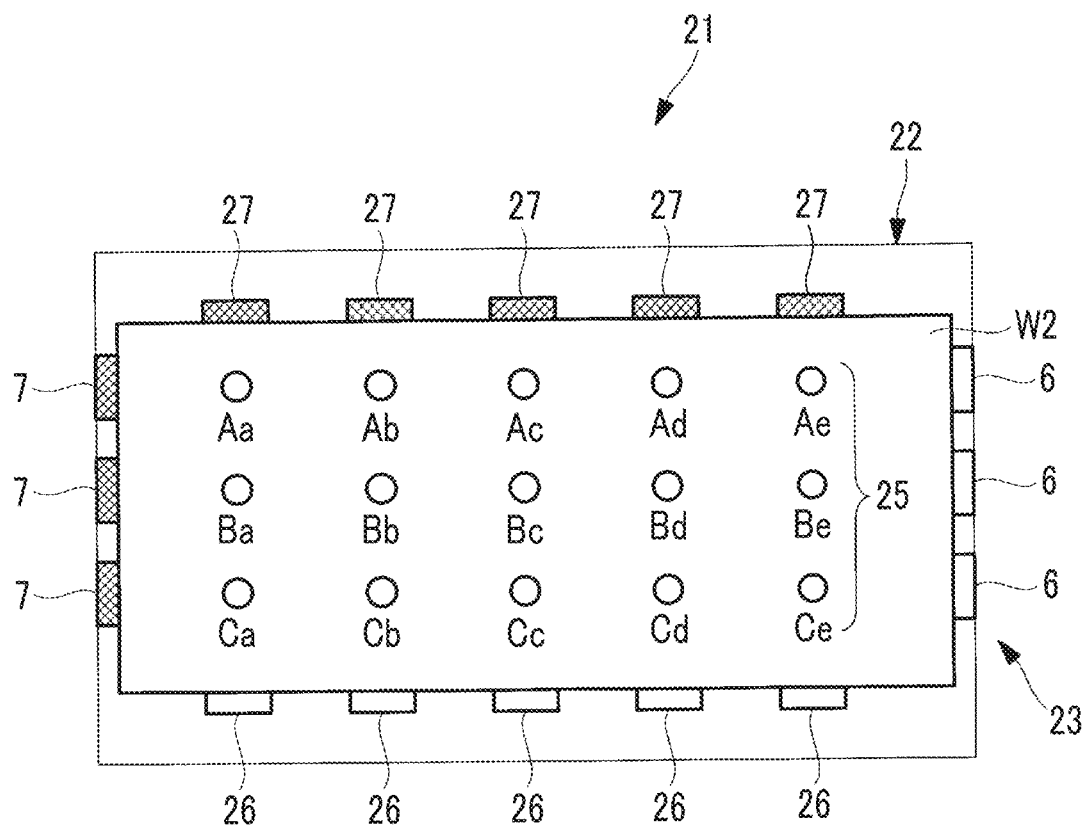
FIG. 9 is a schematic top view of a supporting device according to a second embodiment of the present invention.

Next, a second embodiment according to the present invention will be described with reference to FIG. 9. The second embodiment is different from the first embodiment mainly in a shape of the plate-shaped workpiece and a structure of the supporting device. The same reference numerals will be assigned to the same configurations as those according to the first embodiment, and detailed description thereof will be omitted.

A plate-shaped workpiece W2 according to the present embodiment has a double curved shape (a so-called double contour skin) in which a plate-shaped member is curved in advance to have a curvature in a plurality of directions.

In addition, a supporting surface of a jig 22 according to the present embodiment is formed as a curved surface having the curvature in the plurality of directions so as to correspond to the plate-shaped workpiece W2.

In addition, a supporting device 21 according to the present embodiment has a second pressing portion 23. The second pressing portion 23 has a third contact member 26 and a fourth contact member 27. The third contact member 26 and the fourth contact member 27 are disposed in an end portion of the jig 22. In addition, the third contact member 26 and the fourth contact member 27 are disposed to face each other across the supporting surface 4 in an orthogonal direction orthogonal to a direction in which the first contact member 6 and the second contact member 7 face each other. The third contact member 26 is in contact with one end of the plate-shaped workpiece W2 in the orthogonal direction. The fourth contact member 27 is in contact with the other end in the orthogonal direction of the plate-shaped workpiece W2. In addition, a plurality of (five in the present embodiment) second pressing portions 23 are provided, and the plurality of second pressing portions 23 are aligned at a substantially equal interval along the end portion of the plate-shaped workpiece W2. The structure of the third contact member 26 and the fourth contact member 27 is the same as the structure of the first contact member 6 and the second contact member 7, and description thereof will be omitted.

In addition, the supporting surface 4 according to the present embodiment has 15 sensors 25 in total. Three rows are disposed along the direction in which the first contact member 6 and the second contact member 7 face each other (hereinafter, referred to as a "line direction"). Five rows are disposed along the direction in which the third contact member 26 and the fourth contact member 27 face each other (hereinafter, referred to as a "row direction"). Hereinafter, for convenience, the reference numerals A, B, and C are sequentially assigned to the rows along the line direction from the fourth contact member 27 side (upper side in FIG. 9), and the reference numerals a, b, c, d, and e are sequentially assigned to the rows along the row direction from the second contact member 7 side (left side in FIG. 9). That is, the reference numeral Aa will be assigned to the sensor 25 (sensor 25 disposed at the upper left in FIG. 9) disposed on the second contact member 7 side which is closest to the fourth contact member 27.

Next, a supporting method of the workpiece W2 according to the present embodiment will be described. With regard to the supporting method, detailed description of steps the same as those according to the first embodiment will be omitted.

The plate-shaped workpiece W2 curved in advance on the supporting surface 4 of the jig is placed on the supporting surface 4 of the jig by using the transport device (not illustrated) such as the crane.

In the present embodiment, when the workpiece W2 is placed on the supporting surface 4, the workpiece W2 is placed to come into contact with the first contact member 6 and the third contact member 26 which are fixed to the jig. That is, the workpiece W2 is positioned, based on the first contact member 6 and the third contact member 26. After the workpiece W2 is placed to come into contact with the first contact member 6 and the third contact member 26, the second contact member 7 and the fourth contact member 27 are brought into contact with the workpiece W2.

Next, the control device inputs the load in the row direction to the workpiece W2. That is, the fourth contact member 27 is moved in the direction in which the third contact member 26 is disposed (second moving step). At this time, among the five fourth contact members 27, the fourth contact member 27 disposed closest to the second contact member 7 is sequentially moved. When all of the five fourth contact members 27 are moved, the control device determines whether or not all of the sensors 25 disposed on the supporting surface 4 determine that the workpiece W2 and the supporting surface 4 are in contact with each other.

Then, when any one of the sensors 25 determines that the workpiece W2 and the supporting surface are not in contact with each other, the control device inputs the load in the line direction to the workpiece W2. That is, the second contact member 7 is moved in the direction in which the first contact member 6 is disposed.

The method of moving the second contact member 7 toward the first contact member 6 is the same as that according to the first embodiment. First, the second contact member 7 is moved until the sensor 25 disposed in the row c determines that the workpiece W2 and the supporting surface are in contact with each other. In a state where the sensor 25 disposed in the row c determines that the workpiece W2 and the supporting surface are in contact with each other, in a case where the sensors 25 disposed in the row a and the row b determine that the workpiece W2 and the supporting surface are not in contact with each other, the second contact member 7 is further moved until the sensors 25 disposed in the row a and the row b determine that the workpiece W2 and the supporting surface are in contact with each other. In a state where the sensors 25 disposed in the row a and the row b determine that the workpiece W2 and the supporting surface are in contact with each other, in a case where the sensors 25 disposed in the row d and the row e determine that the workpiece W2 and the supporting surface are not in contact with each other, the first contact member 6 is moved until the sensors 25 disposed in the row d and the row e determine that the workpiece W2 and the supporting surface are not in contact with each other.

In a case where all of the sensors 25 determine that the workpiece W2 and the supporting surface are in contact with each other, the first contact member 6, the second contact member 7, the third contact member 26, and the fourth contact member 27 are stopped, and a state of the workpiece W2 is fixed to be maintained at a current state. In this way, the workpiece W2 and the supporting surface are in close contact with each other in all regions.

Next, the control device drives the vacuum pump so that the workpiece W2 is suctioned into the supporting surface in a vacuum state. In this way, the workpiece W2 is suctioned by the suction portion. Accordingly, the workpiece W2 and the supporting surface can be more firmly brought into close contact with each other.

In this way, the supporting surface and the workpiece W2 are brought into close contact with each other, and the plate-shaped workpiece W2 is supported by the supporting device 21.

According to the present embodiment, the following operational effects can be achieved.

In the present embodiment, the third contact member 26 and the fourth contact member 27 move toward the other. In this manner, the load can be input to the workpiece W2 having the double curved shape in the orthogonal direction. In this way, the load in the tangential direction of the supporting surface can be input in the plurality of directions. Therefore, the plate-shaped workpiece W2 can be preferably supported in a state having a complicated curved shape such as the double curved shape.

Third Embodiment

Next, a third embodiment according to the present invention will be described with reference to FIG. 10. The third embodiment is different from the first embodiment mainly in a shape of the plate-shaped workpiece and a structure of the supporting device. The same reference numerals will be assigned to the same configurations as those according to the first embodiment, and detailed description thereof will be omitted.

Figure 10:
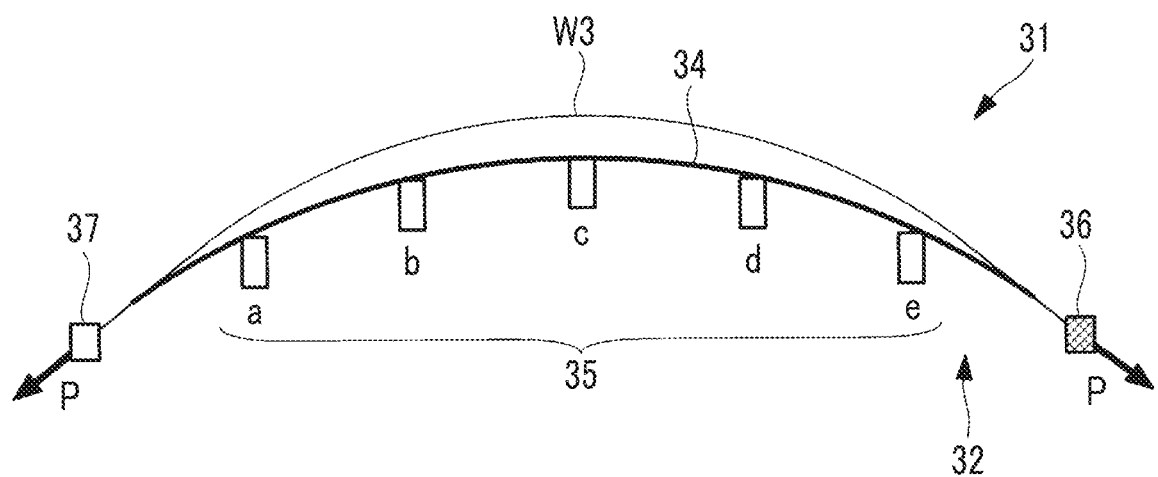
FIG. 10 is a schematic sectional view of a supporting device according to a third embodiment of the present invention.

As illustrated in FIG. 10, a plate-shaped workpiece W3 according to the present embodiment is a so-called single contour skin in which a plate-shaped member is curved in advance to have a curvature in a predetermined direction, and has a substantially arc shaped in cross section. In addition, the workpiece W3 is placed on the supporting surface 34 so that a protruding side surface is located upward. As in the first embodiment, the workpiece W3 according to the present embodiment is curved in advance so that the curvature is smaller than that of the curved portion of the supporting surface 34.

The supporting surface 34 of a jig 32 according to the present embodiment is a surface curved to protrude upward, and has a substantially arc shape in cross section.

In addition, the supporting device 31 according to the present embodiment is different from that according to the first embodiment in that a first clamp portion 36 and a second clamp portion 37 are provided instead of the first contact member 6 and the second contact member 7.

The first clamp portion 36 is disposed in the jig 32, and grips one end of the workpiece W3 placed on the supporting surface 34. The second clamp portion 37 is disposed in the jig 32 to face the first clamp portion 36 across the supporting surface 34, and grips the other end of the workpiece W3 placed on the supporting surface 34. The first clamp portion 36 and the second clamp portion 37 grip the plate-shaped workpiece W3 by interposing the plate-shaped workpiece W3 in the plate thickness direction as in a so-called screw clamp. In addition, the first clamp portion 36 and the second clamp portion 37 are connected to a driving device (not illustrated) that pulls the first clamp portion 36 and the second clamp portion 37 on an extension line of the tangential direction of the supporting surface 34.

Next, a method of supporting the workpiece W3 according to the present embodiment will be described. With regard to the supporting method, detailed description of steps the same as those according to the first embodiment will be omitted.

First, the plate-shaped workpiece W3 curved in advance on the supporting surface 34 of the jig 32 is placed on the supporting surface 34 of the jig 32 by a transport device (not illustrated) such as the crane. When the plate-shaped workpiece W3 is placed, the workpiece W3 is placed so that the curved shape of the workpiece W3 and the curved shape of the supporting surface 34 correspond to each other. At this time, the curvature of the workpiece W3 is smaller than the curvature of the supporting surface 34. Accordingly, the entire surface of the workpiece W3 cannot be brought into contact with the supporting surface 34. Therefore, first, workpiece W3 is placed on the supporting surface 34 so that the central portion of the workpiece W3 comes into contacts with the central portion of the supporting surface 34. That is, in this state, both end portions of the workpiece W3 are in a state of being separated upward from the supporting surface 34. Next, both end portions of the workpiece W3 are pressed against the supporting surface 34. At this time, the central portion of the workpiece W3 moves upward due to the reaction of pressing both end portions of the workpiece W3. That is, the workpiece W3 is in a state where both end portions are in contact with the supporting surface 34, that is, a state where the central portion is separated upward from the supporting surface 34 (state illustrated in FIG. 10).

Next, the placed workpiece W3 is gripped by the first clamp portion 36 and the second clamp portion 37 (first clamping step and second clamping step).

Next, the control device drives the driving device to move the second clamp portion 37 in a direction away from the first clamp portion 36 so that the load in the tangential direction of the supporting surface 34 is input to the workpiece W3 (moving step). A method of moving the second clamp portion 37 is substantially the same as the method of moving the second contact member 7 in the first embodiment. First, the second clamp portion 37 is moved until the sensor c determines that the workpiece W3 and the supporting surface 34 are in contact with each other. In a state where the sensor c determines that both of these are in contact with each other, in a case where the sensor a and the sensor b determine that both of these are not in contact with each other, the second clamp portion 37 is further moved until the sensor a and the sensor b determine that both of these are in contact with each other. In a state where the sensors a and b determine that both of these are in contact with each other, in a case where the sensors d and e determine that both of these are not in contact with each other, the first clamp portion 36 is moved until the sensors d and e determine that both of these are in contact with each other.

In a case where all of the sensors 35 determine that the workpiece W3 and the supporting surface 34 are in contact with each other, the first clamp portion 36 and the second clamp portion 37 are stopped, and a state of the workpiece W3 is fixed to be maintained at a current state. In this way, the workpiece W3 and the supporting surface 34 are in close contact with each other in all regions.

Next, the control device drives the vacuum pump so that the workpiece W3 is suctioned into the supporting surface 34 in a vacuum state. In this way, the workpiece W3 is suctioned by the suction portion. Accordingly, the workpiece W3 and the supporting surface 34 can be more firmly brought into close contact with each other.

In this way, the supporting surface 34 and the workpiece W3 are brought into close contact with each other, and the plate-shaped workpiece W3 is supported by the supporting device 31.

According to the present embodiment, the following operational effects can be achieved.

In the present embodiment, the load in the tangential direction of the supporting surface 34 is input to the workpiece W3 by moving the first clamp portion 36 and the second clamp portion 37 toward the other. That is, the first clamp portion 36 and the second clamp portion 37 pull the workpiece W3 in the direction intersecting the plate thickness direction. In this manner, the tension is input to the workpiece W3. When the load in the tangential direction is input to the workpiece W3, the horizontal component force and the vertical component force are applied to the workpiece W3. Since the vertical component force is applied to the workpiece W3, the plate-shaped workpiece W3 deforms in the direction in which the workpiece W3 comes into contact with the supporting surface 34 of the jig 32. Accordingly, the curved supporting surface 34 of the jig 32 and the workpiece W3 can be brought into close contact with each other. Therefore, the plate-shaped workpiece W3 can be preferably supported. Accordingly, when the processing such as the plate thickness processing is performed on the exposed surface (that is, a surface opposite to a surface in contact with the supporting surface 34 of the jig 32) of the workpiece W3, processing work can be preferably carried out.

In addition, the load is input to the workpiece W3 in the tangential direction of the supporting surface 34. Accordingly, compared to a case where the load is input in the plate thickness direction, it is possible to suppress the friction generated between the supporting surface 34 and the workpiece W3. Therefore, the supporting surface 34 and the workpiece W3 can be easily brought into close contact with each other, and the plate-shaped workpiece W3 can be preferably supported.

The present invention is not limited to the invention according to each of the above-described respective embodiments, and can be appropriately modified within the scope not departing from the gist of the invention.

For example, in the above-described respective embodiments, an example has been described in which the present invention is applied to the supporting device and the supporting method for supporting the plate-shaped workpiece. However, the present invention is not limited thereto. For example, the present invention may be applied to the supporting device and the supporting method for supporting a frame W4 or a stringer W5 subjected to cross-section processing on the plate-shaped workpiece as illustrated in FIGS. 11 to 13.

In an aircraft, the plate thickness processing is also performed on the frame W4 or the stringer W5 formed of sheet metal for weight reduction. When the plate thickness processing is performed on the frame W4 or the stringer W5, the workpiece needs to be attached to the jig. However, the workpiece cannot be properly attached due to a molding error. Accordingly, the number of pressing clamps tends to increase. Therefore, it is necessary to change the clamps multiple times when the processing is performed. Accordingly, there is a possibility that changing the clamps may cause an increase in the processing cost. Therefore, the above-described respective embodiments are applied to the frame W4 or the stringer W5. In this manner, it is possible to realize very accurate plate thickness processing in which the clamps do not need to be changed.

Figure 11:
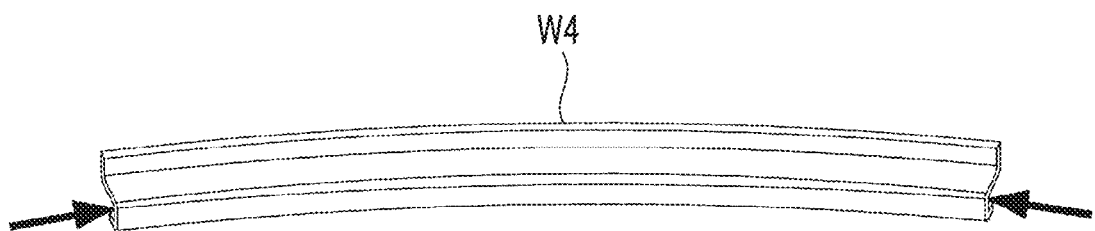
FIG. 11 is a perspective view illustrating a modification example of FIG. 1.
Figure 12:
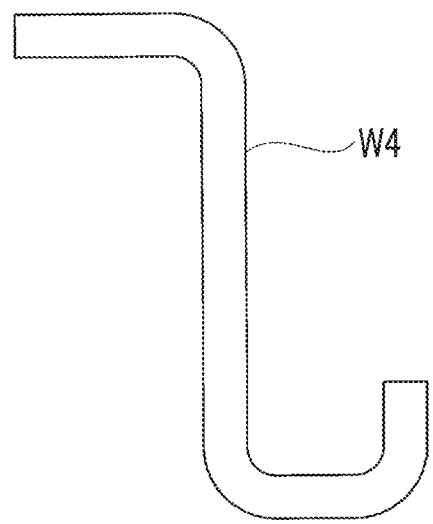
FIG. 12 is a side view of a frame in FIG. 11.

Specifically, as illustrated in FIG. 11, as in the first embodiment, the load is input to the frame W4 curved in a predetermined direction, in the tangential direction (arrow direction in FIG. 11) of the supporting surface (not illustrated) for supporting the frame W4. In this manner, the frame W4 and the supporting surface can be brought into close contact with each other. Accordingly, for the frame W4, it is possible to realize very accurate plate thickness processing in which the clamps do not need to be changed.

Figure 13:
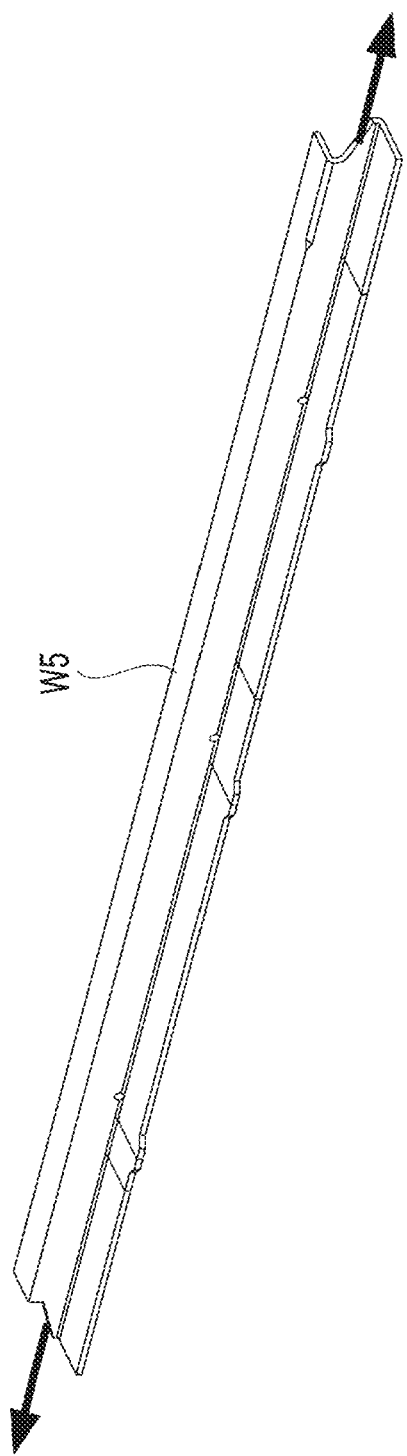
FIG. 13 is a perspective view illustrating a modification example of FIG. 1.

In addition, as illustrated in FIG. 13, even in a case of the linear stringer W5, both ends are pulled in an arrow direction in FIG. 13. In this manner, distortion can be eliminated, and the stringer can be brought into close contact with the supporting surface of the jig. Therefore, for the stringer W5, it is also possible to realize very accurate plate thickness processing in which the clamps do not need to be changed.

In addition, in the above-described respective embodiments, a configuration has been described in which the supporting device includes the control device. However, the control device may be provided separately from the supporting device.

In addition, in the above-described respective embodiments, an example has been described in which the supporting device is controlled by the control device. However, the present invention is not limited thereto. For example, operators may sequentially operate the supporting device without using the control device.

In addition, in the above-described respective embodiments, an example has been described in which the workpiece is suctioned into the supporting surface by the suction portion. However, the suction portion may be omitted in the present invention. In the above-described respective embodiments, the load is input to the workpiece in the tangential direction. In this manner, close contact capability between the workpiece and the supporting surface can be improved. Therefore, even if the suction portion is omitted, the workpiece and the supporting surface can be preferably brought into close contact with each other.

In addition, the number of pressing portions and sensors in the above-described respective embodiments is not limited to the description of the above-described respective embodiments. Any number other than the number described in the above-described respective embodiments may be adopted.

In addition, in the above-described respective embodiments, an example has been described in which both of the facing contact members are movable. However, the present invention is not limited thereto. A configuration may be adopted in which only one of the facing contact members is movable and the other has only a function of fixing the workpiece.

The invention claimed is:

1. A workpiece supporting device for supporting a plate-shaped workpiece, comprising:
    a jig having a curved supporting surface for supporting the workpiece;
    a first contact member disposed in the jig, and coming into contact with one end portion which is an end portion in one direction of the workpiece placed on the supporting surface; and
    a second contact member disposed in the jig to face the first contact member across the supporting surface, and coming into contact with the other end portion in the one direction of the workpiece placed on the supporting surface,
    wherein at least one of the first contact member and the second contact member moves along the supporting surface toward the other and presses the workpiece so that a load in a tangential direction of the supporting surface is input to the workpiece placed on the supporting surface.

2. The workpiece supporting device according to claim 1, further comprising:
    a third contact member disposed in the jig, and coming into contact with one end portion which is an end portion in an intersecting direction intersecting the one direction of the workpiece placed on the supporting surface; and
    a fourth contact member disposed in the jig to face the third contact member across the supporting surface, and coming into contact with the other end portion in the intersecting direction of the workpiece placed on the supporting surface,
    wherein at least one of the third contact member and the fourth contact member moves toward the other so that the load in the tangential direction of the supporting surface which is the intersecting direction is input to the workpiece placed on the supporting surface.

3. The workpiece supporting device according to claim 1, further comprising:
    a plurality of sensors disposed on the supporting surface to determine whether the supporting surface and the workpiece are in contact with each other.

4. A workpiece supporting device for supporting a plate-shaped workpiece, comprising:
    a jig having a curved supporting surface for supporting the workpiece;
    a first clamp portion disposed in the jig, and clamping one end portion which is an end portion in one direction of the workpiece placed on the supporting surface; and
    a second clamp portion disposed in the jig to face the first clamp portion across the supporting surface, and clamping the other end portion in the one direction of the workpiece placed on the supporting surface,
    wherein at least one of the first clamp portion and the second clamp portion moves in a direction away from the other so that a load in a tangential direction of the supporting surface is input to the workpiece placed on the supporting surface.

5. A workpiece supporting method for supporting a plate-shaped workpiece by using a supporting device including a jig having a curved supporting surface for supporting the workpiece, a first contact member disposed in the jig, and coming into contact with one end portion which is an end portion in one direction of the workpiece placed on the supporting surface, and a second contact member disposed in the jig to face the first contact member across the supporting surface, and coming into contact with the other end portion in the one direction of the workpiece placed on the supporting surface, the method comprising:
    a placement step of placing the workpiece on the supporting surface;
    a first contact step of bringing the one end portion of the workpiece and the first contact member into contact with each other;
    a second contact step of bringing the other end portion of the workpiece and the second contact member into contact with each other; and
    a first moving step of moving at least one of the first contact member and the second contact member along the supporting surface toward the other and pressing the workpiece so that a load in a tangential direction of the supporting surface is input to the workpiece placed on the supporting surface.

6. The workpiece supporting method according to claim 5,
    wherein the supporting device includes
        a third contact member disposed in the jig, and coming into contact with one end portion which is an end portion in an intersecting direction intersecting the one direction of the workpiece placed on the supporting surface, and
        a fourth contact member disposed in the jig to face the third contact member across the supporting surface, and coming into contact with the other end portion in the intersecting direction of the workpiece placed on the supporting surface, and
    wherein the workpiece supporting method further comprises a second moving step of moving at least one of the third contact member and the fourth contact member toward the other so that the load in the tangential direction of the supporting surface is input to the workpiece placed on the supporting surface.

7. The workpiece supporting method according to claim 5, further comprising;
    a step of determining whether or not the supporting surface and the workpiece are in contact with each other by using a plurality of sensors disposed on the supporting surface.

8. A workpiece supporting method for supporting a plate-shaped workpiece by using a supporting device including a jig having a curved supporting surface for supporting the workpiece, a first clamp portion disposed in the jig, and clamping one end portion which is an end portion in one direction of the workpiece placed on the supporting surface, and a second clamp portion disposed in the jig to face the first clamp portion across the supporting surface, and clamping the other end portion in the one direction of the workpiece placed on the supporting surface, the method comprising:
- a placement step of placing the workpiece on the supporting surface;
- a first clamping step of clamping the one end portion of the workpiece by using the first clamp portion;
- a second clamping step of clamping the other end portion of the workpiece by using the second clamp portion; and
- a moving step of moving at least one of the first clamp portion and the second clamp portion in a direction away from each other so that a tensile load in a tangential direction of the supporting surface is input to the workpiece placed on the supporting surface.

* * * * *